US009502187B2

(12) United States Patent
Jung et al.

(10) Patent No.: US 9,502,187 B2
(45) Date of Patent: Nov. 22, 2016

(54) METHOD FOR CONTROLLING A CURRENT-INTERRUPTING DEVICE IN A HIGH-VOLTAGE ELECTRICAL NETWORK

(75) Inventors: Thierry Jung, Lyons (FR); Tian Liu, Lyons (FR); Houria Siguerdidjane, Bures-sur-Yvette (FR); Marc Petit, Orsay (FR)

(73) Assignee: Alstom Technology Ltd., Baden (CH)

( * ) Notice: Subject to any disclaimer, the term of this patent is extended or adjusted under 35 U.S.C. 154(b) by 305 days.

(21) Appl. No.: 14/115,338

(22) PCT Filed: Apr. 30, 2012

(86) PCT No.: PCT/EP2012/057933
§ 371 (c)(1),
(2), (4) Date: Jan. 22, 2014

(87) PCT Pub. No.: WO2012/150225
PCT Pub. Date: Nov. 8, 2012

(65) Prior Publication Data
US 2014/0126100 A1   May 8, 2014

(30) Foreign Application Priority Data

May 3, 2011   (FR) ...................................... 11 53779

(51) Int. Cl.
*H01H 7/16*   (2006.01)
*H02H 3/02*   (2006.01)
*H02H 7/04*   (2006.01)

(52) U.S. Cl.
CPC ............... *H01H 7/16* (2013.01); *H02H 3/021* (2013.01); *H02H 7/04* (2013.01)

(58) Field of Classification Search
CPC .......... H02H 3/021; H02H 7/04; H02H 7/16
USPC ............................................................ 361/2
See application file for complete search history.

(56) References Cited

U.S. PATENT DOCUMENTS

2004/0124814 A1*   7/2004   Tsutada ..................... G05F 1/12
                                                               323/247
2006/0232264 A1*  10/2006   Jurisch ......................... 324/142
(Continued)

FOREIGN PATENT DOCUMENTS

DE    196 41 116 A1    4/1998
EP    0 222 727 A1     5/1987
(Continued)

OTHER PUBLICATIONS

International Search Report in PCT/EP2012/057933 dated Aug. 11, 2012.
(Continued)

*Primary Examiner* — Zeev V Kitov
*Assistant Examiner* — Kevin J Comber
(74) *Attorney, Agent, or Firm* — Nixon Peabody LLP; Khaled Shami

(57) ABSTRACT

The invention relates to a method of controlling switchgear in order to estimate the remanent flux value of a power transformer during disconnection from a high-voltage electrical network using voltage measurements delivered by a capacitive voltage transformer by correcting the transfer function of the capacitive voltage transformer, and in which said value is delivered to a controller that determines the optimum switchgear switching instant.

3 Claims, 4 Drawing Sheets

(56) References Cited

U.S. PATENT DOCUMENTS

2010/0039737 A1    2/2010  Koshizuka et al.
2010/0085668 A1*  4/2010  Kinoshita et al. .............. 361/35

FOREIGN PATENT DOCUMENTS

| | | | |
|---|---|---|---|
| EP | 2 141 780 A1 | 1/2010 | |
| FR | 2 140 529 A1 | 1/1973 | |
| WO | 80/01516 A1 | 7/1980 | |

OTHER PUBLICATIONS

Written Opinion of the International Searching Authority in PCT/EP2012/057933 dated Mar. 11, 2013.

* cited by examiner

METHOD FOR CONTROLLING A CURRENT-INTERRUPTING DEVICE IN A HIGH-VOLTAGE ELECTRICAL NETWORK

CROSS REFERENCE TO RELATED APPLICATIONS

This application is the national stage of International Application No. PCT/EP2012/057933, filed Apr. 30, 2012, entitled, "Method For Controlling A Current-Interrupting Device In A High-Voltage Electrical Network," which claims the benefit of priority of French Patent Application No. 11 53779, filed May 3, 2011, the contents of both of which are incorporated herein by reference in their entirety.

TECHNICAL FIELD

The invention relates to a method of controlling switchgear in a high-voltage electrical network.

Below, in order to simplify the description, switchgear is considered to be of the circuit breaker type.

PRIOR ART

The invention relates to a method of reducing inrush currents associated with operating power transformer switchgear in a high-voltage electrical network, said method making it possible to determine, in optimum manner, the switching instants for said switchgear.

Operating switchgear, such as circuit breakers, in a high-voltage electrical network is a source of disturbances such as voltage surges and inrush currents. Such phenomena are linked in particular to the complexity of energy transport networks and their interconnections. In order to control the transients associated with such operations, there exist solutions such as pre-inserting resistors and inductors prior to opening and/or closing said switchgear, but the most effective solution is obtained by "controlled" operation, that makes it possible to choose an optimum instant for opening or closing as a function of the instantaneous voltage of the network.

Disconnecting a vacuum power transformer generates few transients. However, a closing operation performed at a non-controlled instant may generate considerable inrush currents that are likely to reach the fault current levels of the transformers. Such currents stress the winding, creating severe temporary voltages that damage the quality of the supply of electricity and that give rise to unwanted operations as a result of neutral current imbalances. In addition, the electrodynamic stresses exerted inside the windings of the transformer lead to a reduction in the life expectancy of said windings.

In order to resolve such a problem, a prior art solution described in the document given reference [1] at the end of the description consists in implementing an algorithm for calculating the optimum closing instant. That algorithm requires knowledge of the level of the remanent flux, by knowing the voltages at the terminals of the transformer. The voltage transformers used in the high-voltage substations are very often of the capacitive voltage transformer type, because of their cost. However, the performance of such transformers under transient conditions are poorly adapted to that type of application. That is why the common methods of estimating remanent flux use specific voltage transformers.

The value of the magnetic flux is generally obtained by integrating the voltage at the terminals of the power transformer. The remanent flux requires said integration to be continued beyond the disconnection instant of the power transformer, for a period of time that is long enough to enable the flux to reach its equilibrium value, which value is generally different from the value at the instant of disconnection. However, during that time period, the voltage delivered by the capacitive voltage transformer is greatly changed by its own transient conditions. The difficulty consists in eliminating the effects of said transient conditions. The synchronous closing methods known in the art do not address that problem, and make use of specific voltage sensors.

The document given reference [2] at the end of the description describes the controlled operation of power transformers while taking account of the remanent magnetic flux. That controlled operation consists in selecting the appropriate instant for connecting each of the phases of the transformer while taking the remanent flux into account. That document requires the use of specific sensors that present an additional cost. In addition, certain types of power transformer cannot be fitted with such sensors.

The present invention aims to solve those problems by proposing a method making it possible to estimate the remanent flux of a power transformer from the voltage measurement delivered by a capacitive voltage transformer.

SUMMARY OF THE INVENTION

The invention relates to a method of controlling switchgear for disconnecting a power transformer in a high-voltage electric network, the method being characterized in that the remanent flux value of said power transformer is estimated from voltage measurements delivered by a capacitive voltage transformer by correcting the transfer function of the capacitive voltage transformer, and in that said value is delivered to a controller that determines the optimum switchgear switching instant.

Advantageously, this method comprises the following steps:
  determining the transfer function of a capacitive voltage transformer;
  determining the pseudo-inverse transfer function of said capacitive voltage transformer; and
  disconnecting the power transformer.

Advantageously, the transfer function of the capacitive voltage transformer is determined from the electrical circuit of said transformer.

Advantageously, the transfer function of the capacitive voltage transformer is determined by identifying poles and zeros by using the step response of an equivalent filter.

Advantageously, the pseudo-inverse function of the capacitive voltage transformer is determined by insertion of a low-pass filter.

Advantageously, during disconnection of the power transformer there is:
  storing of the voltage output of the capacitive voltage transformer;
  digital processing via a pseudo-inverse transfer function; and
  integration of the corrected signal in order to acquire the value of the remanent flux.

DETAILED DESCRIPTION OF PARTICULAR EMBODIMENTS

Figure 1:
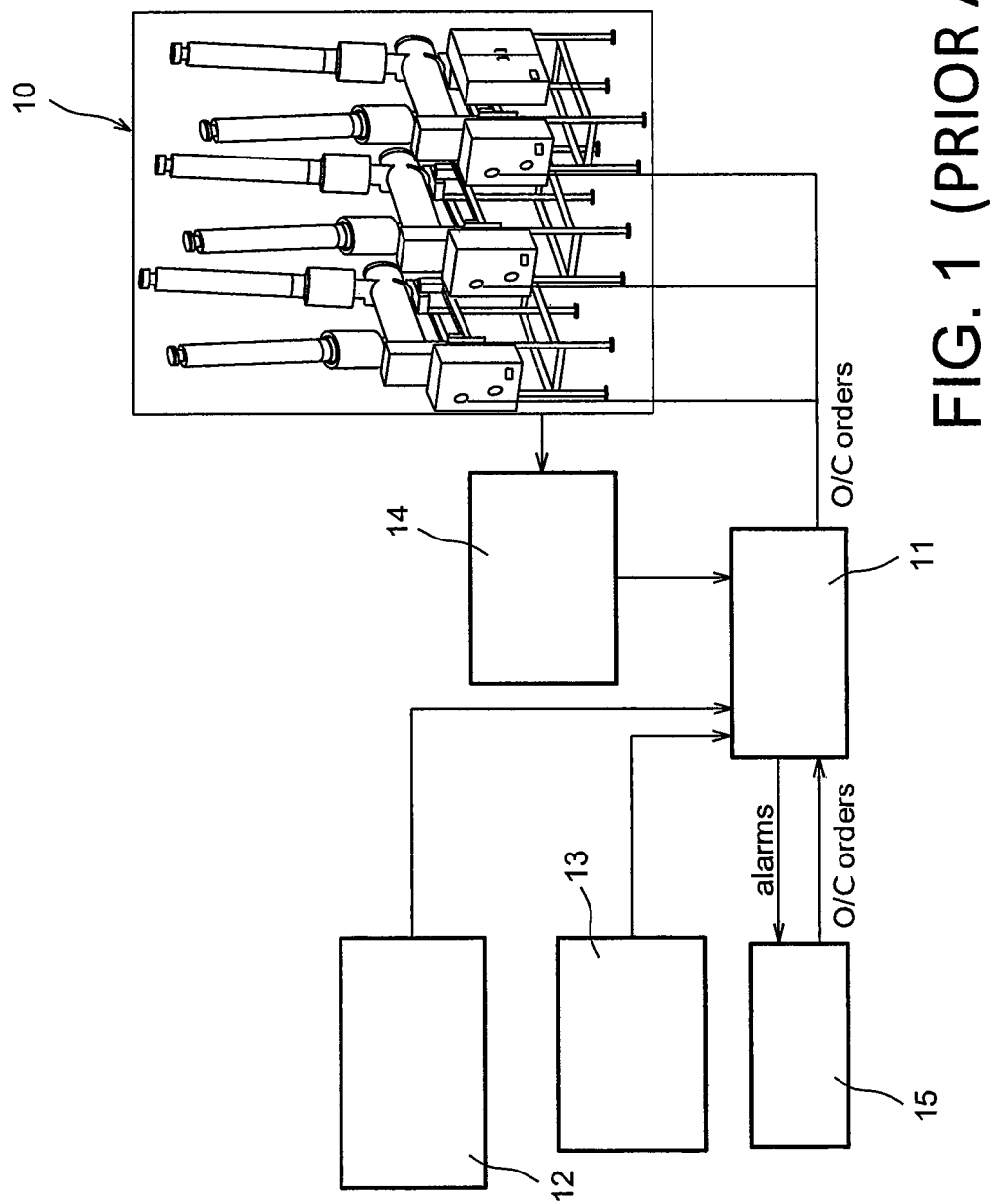
FIG. 1 is a diagram showing, in a prior art system, the controlled operations of a circuit breaker in a high-voltage network.

FIG. 1 is a diagram showing, in a prior art system, the controlled operations of a circuit breaker 10 performed with the help of a controller 11 that receives various different kinds of information:

network information 12, such as:
  reference voltage;
  current; and
  grounding;
adjustment information 13, such as:
  applications;
  time periods; and
  compensation; and
information 14 relating to the circuit breaker 10, such as:
  temperature;
  pressure;
  auxiliary voltage; and
  auxiliary pressure;
which controller is also connected to monitoring control equipment 15, for sending alarm signals to said control equipment, and for receiving orders to open/close (O/C) said circuit breaker 10 therefrom.

Numerous applications require knowledge of the value of the remanent flux of the power transformer, in particular for controlled switching of a power transformer that is not loaded. The uncertainty relating to the remanent flux can significantly reduce the performance of controlled switching. The invention underlines the importance of identifying the remanent flux by means of its influence on waveforms so as to avoid any degradation of the closing instant. The remanent flux depends on the hysteresis of the magnetic material, on the instant of de-excitation, and on the operating conditions of the power system at that instant. It cannot be obtained directly by measurement, but must be derived from a signal that is more easily accessible such as the voltage at the terminals of the transformer. Said voltage is measured and integrated within a short time window on either side of the de-excitation instant. Capacitive voltage transformers (CVTs), which are used as voltage sensors, introduce considerable transient errors that must be taken into account. Most studies of controlled switching of power transformers ignore the intrinsic errors of said capacitive voltage transformers.

When using the secondary voltage of a capacitive voltage transformer it is necessary to reconstitute the waveform of the primary voltage and, while taking the remanent flux into consideration, to set a value in the algorithm responsible for evaluating the optimum closing instant.

Figure 2:
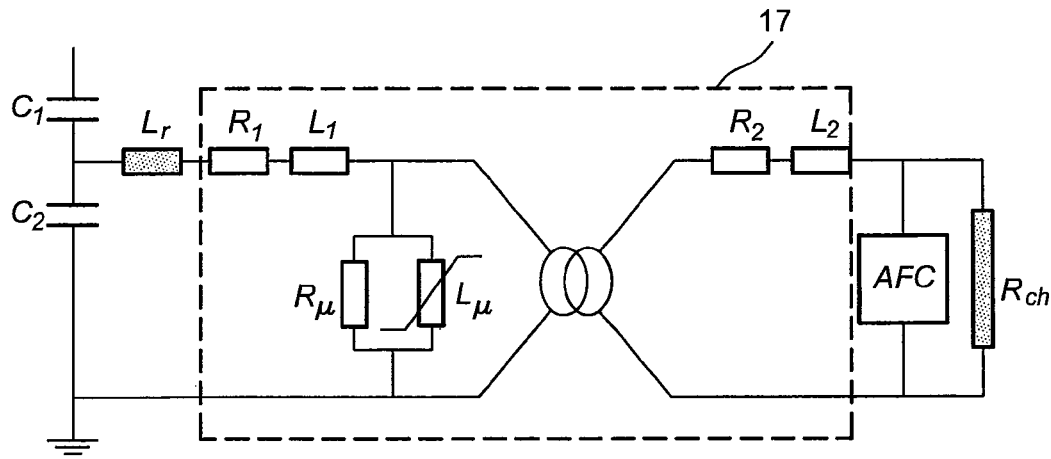
FIGS. 2 and 3 show equivalent circuits of a single phase capacitive voltage transformer with an anti-ferroresonance circuit.
Figure 3:
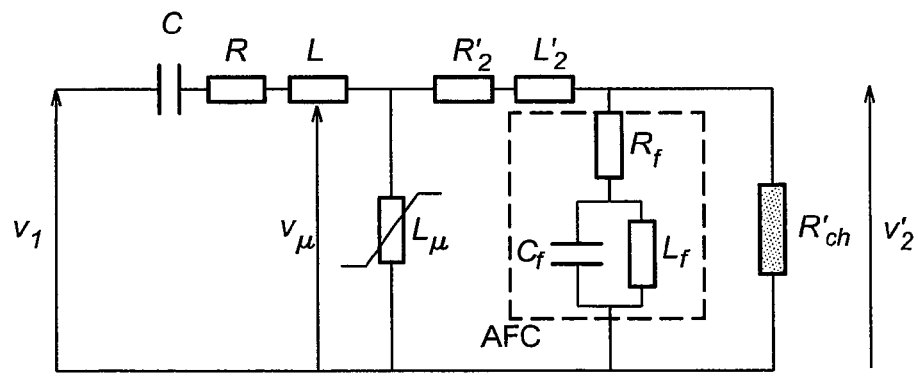

The characteristics of a capacitive voltage transformer are shown in FIG. 2, with a transformer of the step-down inductive type 17. Interaction between the capacitors C1, C2 used as a capacitive voltage divider, and both the adjustment inductance Lr and the branch of the non-linear magnetization inductance Ln of the transformer can generate a particular phenomenon known as ferroresonance. In order to overcome this phenomenon, the manufacturers associate an oscillating anti-ferroresonance circuit (AFC) with the capacitive voltage transformer, which circuit is connected to the secondary winding of the transformer. The model thus shown in FIG. 2 may be simplified as shown in FIG. 3. The equivalent capacitance C is equal to the sum of the capacitances of C1 and C2. The inductance L is the sum of the adjustment inductance Lr and of the winding inductances of the inductive transformer. The resistance R is the resistance of the primary. The magnetization inductance Lµ is then situated in a linear zone, given the voltage levels of the transformer. This inductance may be ignored relative to other components of the capacitive voltage transformer. The capacitive voltage transformer may be considered as a band-pass filter having a transfer function of the type:

$$H_{cvt} = \frac{V_2'(p)}{V_1(p)} = \frac{\sum_{i=1}^{n} a_i p^i}{\sum_{i=o}^{m} b_i p^i}$$

with m≥2, n≥1, m−n≥1.

Figure 4:
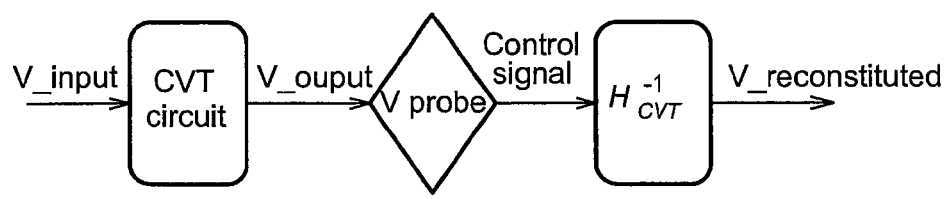
FIG. 4 shows the method of reconstituting the input signal of a capacitive voltage transformer.

FIG. 4 represents the overall method of reconstituting the voltage signal at the input of the capacitive voltage transformer. The voltage at the power transformer on opening is considered to be the input signal V_input. The measurement is carried out during a short window on either side of the disconnection instant. Processing is deferred to "pseudo real-time". The output signal V_output of the capacitive voltage transformer is measured (V probe) and processed using the pseudo inverse transfer function $H_{CVT}^{-1}$ in order to obtain the signal V_reconstituted.

$$H_{cvt}^{-1} = \frac{T(p)}{H_{cvt}} = \frac{\sum_{i=o}^{m} a_i p^i}{\sum_{i=1}^{m} b_i p^i}$$

where T(p) designates a low-pass filter of order m−n.

Direct inversion cannot be carried out because the degree of the transfer function $H_{CVT}$ is greater than or equal to 1. The low-pass filter made in this way is selected as a function of the pass-band of the capacitive voltage transformer. The cut-off frequency of said filter is much higher than the upper limit of the pass-band of the capacitive voltage transformer and the gain of the filter is 1.

Figure 5:
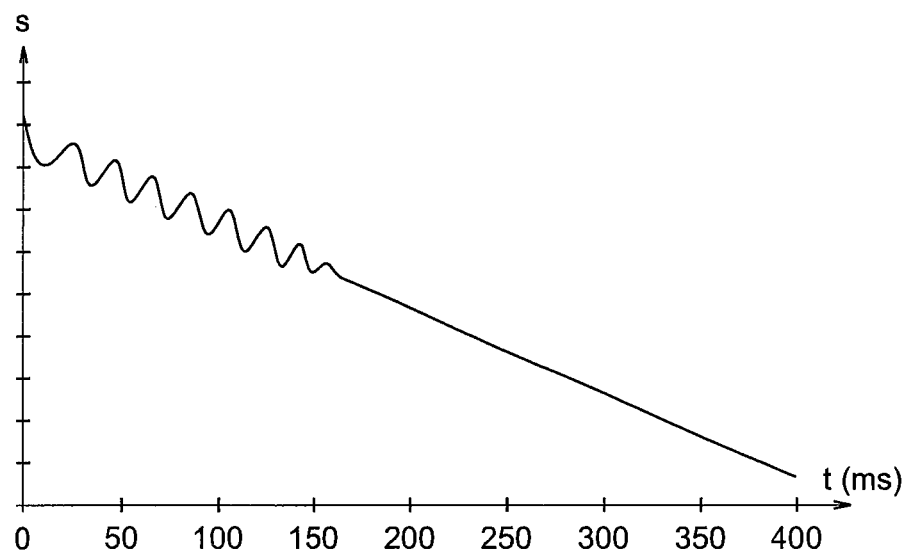
FIG. 5 shows the reconstituted voltage signal after pseudo-inverse transfer function processing of the invention.

FIG. 5 shows the reconstituted voltage signal s after processing by the pseudo-inverse transfer function $H_{CVT}^{-1}$. However, the presence of offsets in the measuring window can lead to divergence of the reconstituted signal because of the low frequency integrator $$\frac{a_0}{b_1 p}.$$

Figure 6:
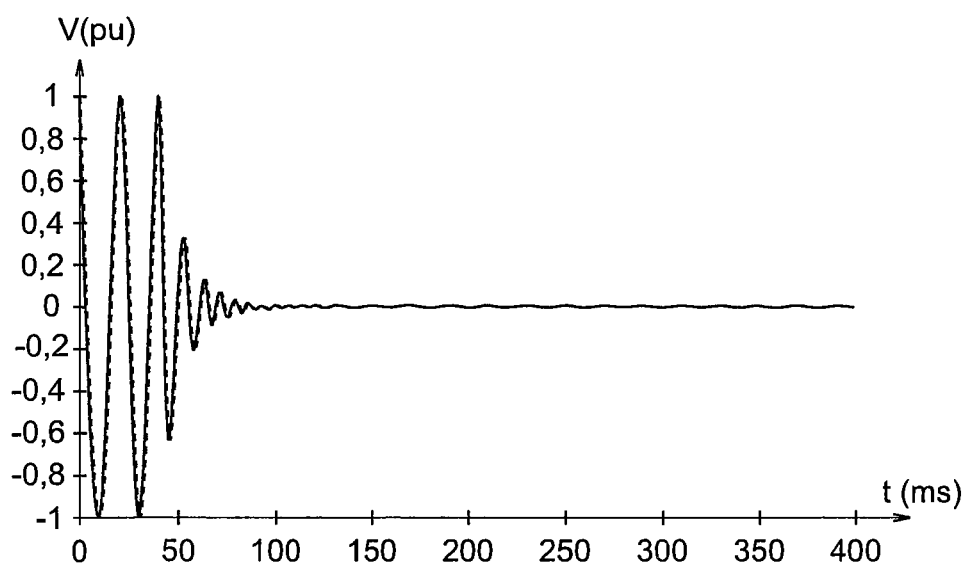
FIG. 6 shows the geometrical correction of the voltage signal in FIG. 5 thus reconstituted relative to real voltage.

FIG. 6 shows the reconstituted and corrected voltage signal as a dotted line and with the real transformer voltage as a continuous line. By using geometrical compensation and by means of a ramp, this divergence may be easily corrected and the signal obtained then corresponds to the voltage signal at the power transformer with very great accuracy.

Figure 7:
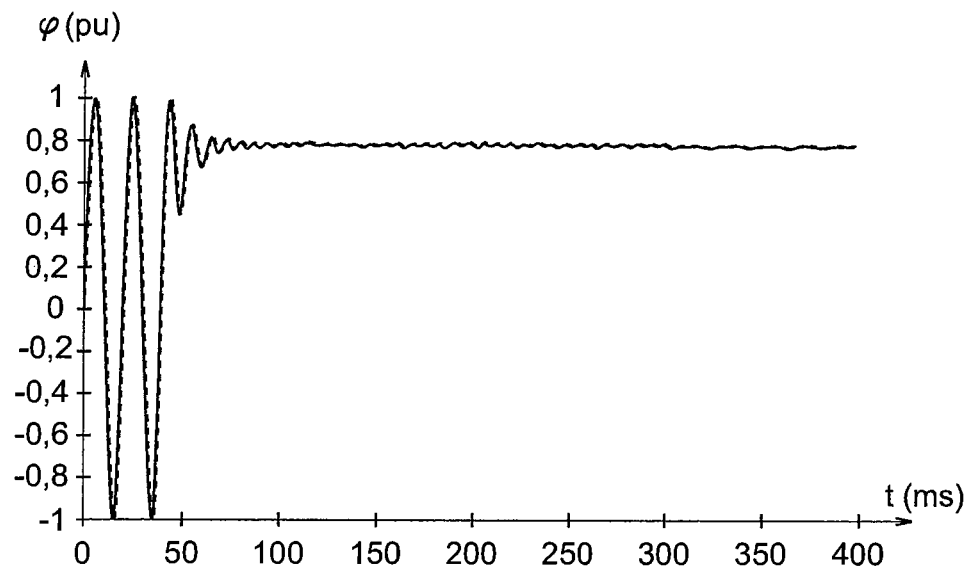
FIG. 7 shows the real flux (continuous line) and the estimated flux (dotted line) when the power transformer is disconnected.

FIG. 7 shows the flux when the power transformer is disconnected, with the real flux (continuous line) and the estimated flux (dotted line).

The reconstituted and corrected signal is then used to obtain the flux signal on disconnecting the power transformer.

Figure 8:
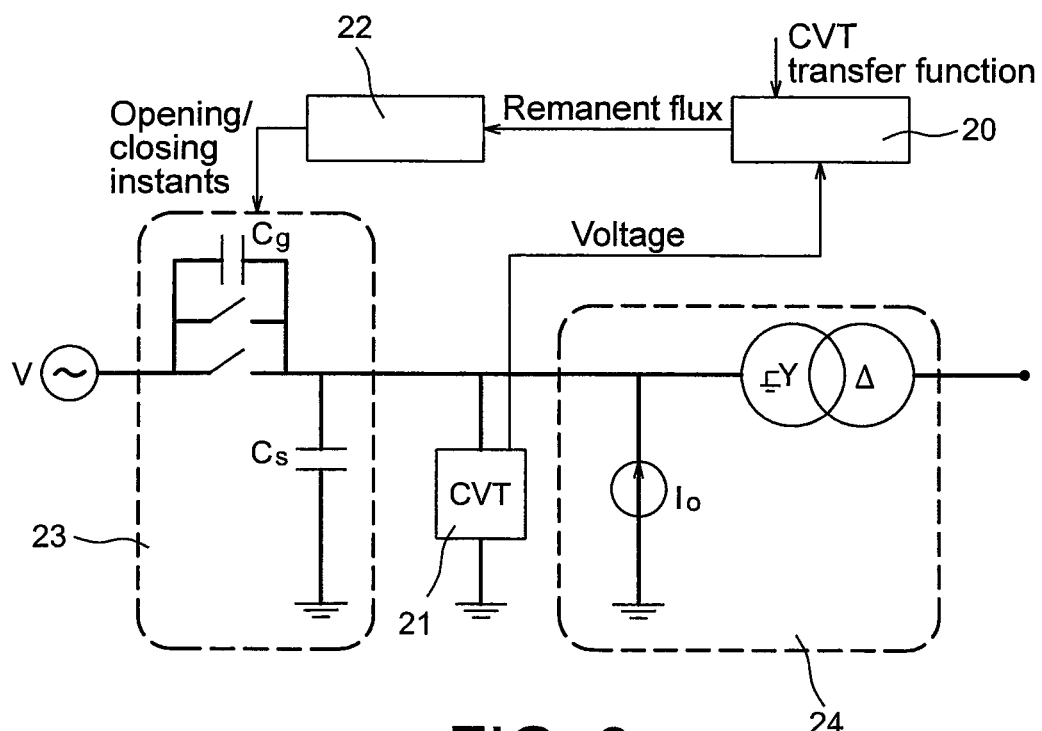
FIG. 8 is the circuit diagram of a system implementing the method of the invention.

FIG. 8 shows a system implementing the method of the invention. This system comprises a computer 20 that receives a voltage from a capacitive voltage transformer 21 and the transfer function of said capacitive voltage transformer, and that delivers the value of the remanent flux to a controller 22 that determines the opening/closing instant for a circuit breaker 23. The capacitive voltage transformer is connected between the output of the circuit breaker 23 and the input of a power transformer 24. V represents the source or the network. The method of the invention thus comprises the following steps in succession:

determining the transfer function of the capacitive voltage transformer:
    from the electrical circuit of said capacitive voltage transformer, if it is provided; or
    by identifying poles and zeros by using the step response of an equivalent filter;
  determining the pseudo-inverse transfer function: The inversion of said transfer function is not direct. In order to comply with the stability conditions imposed by the inversion operation, it is necessary to insert a low-pass filter, which filter is selected so that it does not contribute to the equivalent transient response of the capacitive voltage transformer.
  then, in real time, disconnecting the power transformer, with:
    storing the output voltage of the capacitive voltage transformer;
    digital processing via a pseudo-inverse transfer function; and
    integration of the corrected signal in order to acquire the value of the remanent flux.

The calculation time is compatible with the cycle time for reclosing. The calculations are thus indeed "real time" calculations.

REFERENCES (1) "Manœuvre contrôlée de transformateurs à vide" ["Controlled switching of vacuum transformers"] by Esteban Portales and André Mercier (Electra, no. 212, February 2004).
(2) "Manœuvre contrôôlée de transformateur tenant compte du flux magnétique rémanent—étude de case réel" ["Transformer controlled switching taking account of core remanent flux—a real case study"] by A. Mercier, E. Portales, Y. Filion, and A. Salibi (Cigré, 13-201, session 2002).

The invention claimed is:

1. A method for controlling a switchgear for disconnecting a power transformer with an electrical circuit in a high-voltage electric network, wherein a remnant flux value of said power transformer is estimated from voltage measurements delivered by at least one capacitive voltage transformer connected between the output of the switchgear and the input of the power transformer by correcting a transfer function of said at least one capacitive voltage transformer, wherein the method comprising the following steps:
  preliminary following steps:
    determining the transfer function of the capacitive voltage transformer;
    determining a pseudo-inverse transfer function of said capacitive voltage transformer, wherein the pseudo-inverse transfer function of the capacitive voltage transformer is determined by insertion of a low-pass filter; and then
  in real time, disconnecting the power transformer by:
    measuring the output voltage of the capacitive voltage transformer during a short time window on either side of the disconnecting time;
    storing the output measurement of the capacitive voltage transformer;
    digitally processing the voltage measurement via the pseudo-inverse transfer function to produce a corrected signal;
    integrating the corrected signal in order to acquire the remnant flux value; and
    delivering said remnant flux to a controller that determines an optimum switchgear switching instant.

2. A method according to claim 1, wherein the transfer function of the capacitive voltage transformer is determined from the electrical circuit of said transformer.

3. A method according to claim 1, wherein the transfer function of the capacitive voltage transformer is determined by identifying poles and zeros by using a step response of an equivalent filter.

\* \* \* \* \*